United States Patent
Mitamura

(10) Patent No.: US 7,694,875 B2
(45) Date of Patent: Apr. 13, 2010

(54) IMAGE FORMING APPARATUS AND ELECTRONIC DOCUMENT MANAGEMENT METHOD

(75) Inventor: Yoshihiko Mitamura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 541 days.

(21) Appl. No.: 11/600,084

(22) Filed: Nov. 16, 2006

(65) Prior Publication Data

US 2007/0253019 A1 Nov. 1, 2007

(30) Foreign Application Priority Data

Apr. 28, 2006 (JP) ............................. P2006-126272

(51) Int. Cl.
G06F 17/00 (2006.01)
G06K 7/10 (2006.01)
G06K 7/14 (2006.01)

(52) U.S. Cl. ...................................... 235/375; 235/454
(58) Field of Classification Search .................. 345/178
See application file for complete search history.

(56) References Cited

U.S. PATENT DOCUMENTS

| | | | |
|---|---|---|---|
| 5,442,147 A * | 8/1995 | Burns et al. ............... | 178/18.09 |
| 5,661,506 A * | 8/1997 | Lazzouni et al. ............ | 345/179 |
| 6,330,976 B1 * | 12/2001 | Dymetman et al. ......... | 235/487 |
| 6,651,894 B2 * | 11/2003 | Nimura et al. .............. | 235/494 |
| 2004/0035935 A1 * | 2/2004 | Takahashi et al. ....... | 235/462.09 |
| 2006/0033963 A1 * | 2/2006 | Nishida ...................... | 358/462 |

FOREIGN PATENT DOCUMENTS

JP 2004-280519 10/2004

* cited by examiner

Primary Examiner—Michael G Lee
Assistant Examiner—Suezu Ellis
(74) Attorney, Agent, or Firm—Morgan, Lewis & Bockius LLP

(57) ABSTRACT

An image forming apparatus includes a document-image forming section, a code-image forming section and an acquisition section. The document-image forming section forms a document image on a medium. The code-image forming section forms on the medium a code image containing position information, which is used to specify a position on a surface of the medium. The acquisition section acquires a position shift amount between the document image and the code image, which are formed on the medium.

3 Claims, 14 Drawing Sheets

PRINT DOCUMENT (CODE PAPER)

CODE IMAGE (I)
CODE IMAGE

DOCUMENT IMAGE (YMCK)

CODE IMAGE (I)

DOCUMENT IMAGE (YMCK)

FIG. 12

| MANAGEMENT ID | ELECTRONIC DOCUMENT NAME | PAGE INFORMATION | PAPER SIZE | IMAGE ORIENTATION | X-DIRECTION SHIFT AMOUNT (mm) | Y-DIRECTION SHIFT AMOUNT (mm) |
|---|---|---|---|---|---|---|
| 00000001 | docserver.fujixerox.co.jp/cabinet1/drawer1/folder1/document1.ppt | 1 | A4 | PORTRAIT | 2.2 | 1.0 |
| 00000002 | docserver.fujixerox.co.jp/cabinet1/drawer1/folder1/document1.ppt | 2 | A4 | PORTRAIT | 1.7 | -0.2 |
| 00000003 | docserver.fujixerox.co.jp/cabinet1/drawer1/folder1/document1.ppt | 3 | A4 | PORTRAIT | 1.0 | 1.8 |
| 00000004 | docserver.fujixerox.co.jp/cabinet1/drawer1/folder1/document1.ppt | 4 | A4 | PORTRAIT | 2.0 | -0.6 |
| 00000005 | docserver.fujixerox.co.jp/cabinet1/drawer1/folder1/document1.ppt | 5 | A4 | PORTRAIT | 1.8 | 1.3 |
| 00000006 | docserver.fujixerox.co.jp/cabinet1/drawer1/folder1/document1.ppt | 6 | A4 | PORTRAIT | -0.2 | 0.9 |
| 00000007 | docserver.fujixerox.co.jp/cabinet1/drawer1/folder1/document2.ppt | 1 | A4 | LANDSCAPE | -0.7 | 2.1 |
| 00000008 | docserver.fujixerox.co.jp/cabinet1/drawer1/folder1/document2.ppt | 2 | A4 | LANDSCAPE | -1.5 | 1.2 |
| 00000009 | docserver.fujixerox.co.jp/cabinet1/drawer1/folder1/document3.ppt | 1 | A3 | LANDSCAPE | 4.2 | 3.6 |
| 00000010 | docserver.fujixerox.co.jp/cabinet1/drawer1/folder1/document3.ppt | 2 | A3 | LANDSCAPE | 3.8 | 3.1 |

IMAGE FORMING APPARATUS AND ELECTRONIC DOCUMENT MANAGEMENT METHOD

BACKGROUND

Technical Field

This invention relates to an image forming apparatus such as a copier or a printer, and to an electronic document management method of managing electronic documents printed by the image forming apparatus.

SUMMARY

According to an aspect of the invention, an image forming apparatus includes a document-image forming section, a code-image forming section and an acquisition section. The document-image forming section forms a document image on a medium. The code-image forming section forms on the medium a code image containing position information, which is used to specify a position on a surface of the medium. The acquisition section acquires a position shift amount between the document image and the code image, which are formed on the medium.

BRIEF DESCRIPTION OF THE DRAWINGS

Exemplary embodiments will be described in detail below with reference to the accompanying drawings wherein:

FIG. 12 is a drawing to show a structure example of a database registered in an identification information DB of an ID management server;

DETAILED DESCRIPTION

Exemplary embodiments will be described below in detail with reference to the accompanying drawings.

Figure 1:
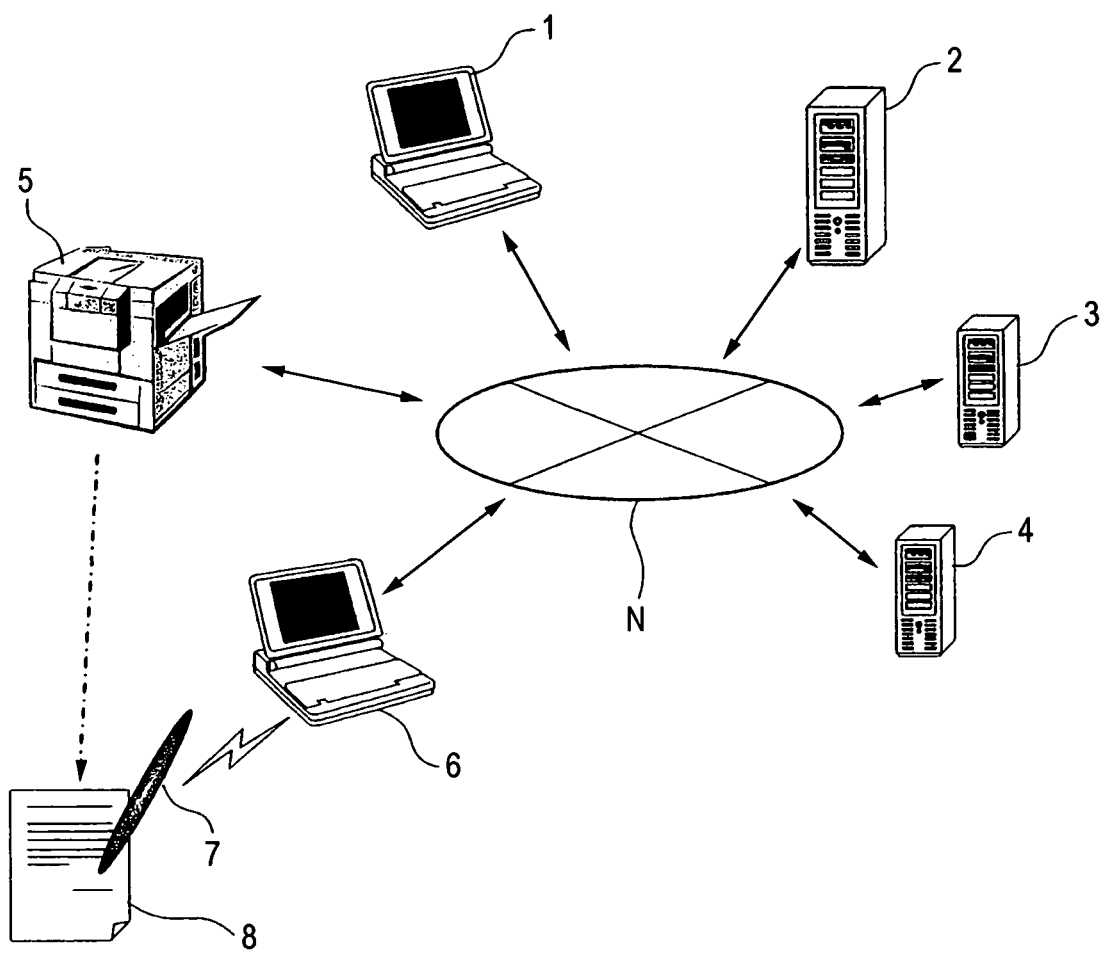
FIG. 1 is a drawing to show a configuration example of an electronic document management system according to an exemplary embodiment of the invention.

FIG. 1 shows a configuration example of an electronic document management system according to an exemplary embodiment of the invention. This system includes various terminals, servers, etc., connected to a network N of Ethernet (registered trademark), etc., for example. In the example, a client terminal 1, an ID management server 2, a document management server 3, a service server 4, a printer 5, and a handwritten-information acquiring terminal 6 are connected to the network N. An electronic pen 7 is connected to the handwritten-information acquiring terminal 6 in a wireless manner. The ID management server 2, the document management server 3 and the service server 4 may be incorporated into a single server.

In the system, an electronic document, which the client terminal 1 gives a command of printing, may be printed on paper on the printer 5. Hereinafter, paper thus printed by the printer 5 is called "code paper" 8. In the system, to postscribe to the code paper 8 using the electronic pen 7, information written with the electronic pen 7 can be reflected to the original electronic document.

To begin with, an outline of printing the code paper 8 will be described.

First, the client terminal 1 transmits a command of printing an electronic document. At this time, the client terminal 1 outputs print information, which is generated by adding print attributes (e.g. number of pages, paper size and image orientation) to the electronic document to be printed, as a print command.

Next, the ID management server 2 receives the print information. The ID management server 2 gives different management IDs to respective pages of the electronic document contained in the print information. The ID management server 2 registers the given management IDs, the electronic document name, the page numbers, the paper size of each page and the image orientation in an identification information DB (described later) in association with each other. The ID management server 2 also transmits print management information, which associates the management IDs and the print information with each other.

The document management server 3 receives the print management information. The document management server 3 registers the management IDs and contents of the respective pages of the electronic document contained in the print management information in an electronic document DB (described later) in association with each other.

The printer 5 receives the print management information. The printer 5 prints the electronic document (document image) on paper based on the contents of the electronic document and the print attributes, which are contained in the print management information. On the other hand, the printer 5 creates identification codes based on the management IDs contained in the print management information. Also, the printer 5 creates position codes, which indicate positions on the paper, based on the print attributes contained in the print management information. Then, the printer 5 prints a code image generated by synthesizing the identification codes and the position codes, on the paper together with the document image. Accordingly, the printer 5 provides the code paper 8. The printer 5 calculates position shift amounts on the code paper 8 (X direction, Y direction) between a position where the document image is formed and a position where the code image is formed. The printer 5 transmits position shift information, which associates the management ID of the code paper 8 and the position shift amount with each other.

Thereafter, the ID management server 2 receives the position shift information. The ID management server 2 registers the position shift amounts in the identification information DB in association with the management ID contained in the position shift information.

Next, an outline of postscribing using the electronic pen 7 will be described.

First, a user postscribes to the code paper 8 using the electronic pen 7. At this time, the electronic pen 7 reads the code image formed on the code paper 8. Next, the electronic pen 7 acquires trace information of the electronic pen 7 on the code paper 8, from a change history of position codes based on the read result of the code image. Also, the electronic pen 7 acquires the management ID of the code paper 8 from the identification code. The electronic pen 7 transmits Writing information, which associates the management IDs and the trace information with each other. The writing information is output from the electronic pen 7 through the handwritten-information acquiring terminal 6 to the network N.

Next, the ID management server 2 receives the writing information. The ID management server 2 reads the position shift amount corresponding to the management IDs contained in the writing information from the identification information DB. Then, the ID management server 2 transmits writing correction information, which associates the position shift amount with the writing information.

Further, the document management server 3 receives the writing correction information. The document management server 3 reads the electronic document corresponding to the management ID contained in the writing correction information from the electronic document DB. Then, the document management server 3 transmits postscribed information, which associates the management ID and the electronic document with each other.

The service server 4 receives the writing correction information. The service server 4 performs a position shift correction on the trace information contained in the writing correction information, using the position shift amount contained in the writing correction information so as to provide corrected trace information. The service server 4 further receives the postscribed information. The service server 4 provides postscribing information, which associates the electronic document contained in the postscribed information and the corrected trace information with each other, through the management ID. That is, the information written with the electronic pen 7 can be reflected to the electronic document. Then, the provided postscribing information is registered in a postscribing information DB (described later) The service server 4 may transmit the postscribing information to the handwritten-information acquiring terminal 6 or the client terminal 1, for example, for displaying the postscribing information on a display of the terminal.

Components forming the electronic document management system shown in FIG. 1 will be described specifically.

In the system, the client terminal 1 has a function of transmitting a print command of an electronic document and may be implemented as a PC (Personal Computer), for example. The "electronic document" is a concept of a document that contains text information and image information and can be displayed as an image. The "print command contains an electronic document and the print attributes of the electronic document as described above. The print attributes contain various settings that can be set on application software, such as single-sided print and double-sided print, in addition to those described above.

Figure 2A:
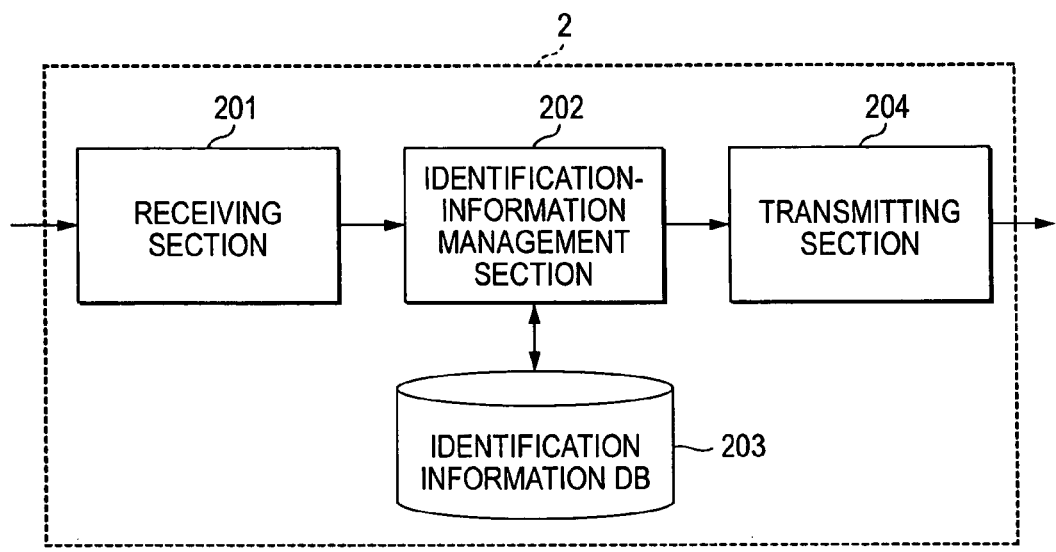
FIG. 2A is a functional block diagram of an ID management server and FIG. 2B is a functional block diagram of a document management server.

FIG. 2A is a functional block diagram to show a configuration example of the ID management server 2. The ID management server 2 includes a receiving section 201, an identification-information management section 202, an identification information DB 203, and a transmitting section 204.

The receiving section 201 receives the print information from the client terminal 1, the position shift information from the printer 5, and the writing information from the electronic pen 7 (handwritten-information acquiring terminal 6).

The identification-information management section 202 gives management IDs, registers various pieces of data in the identification information DB 203, and makes an inquiry. Specifically, when print information is input, the identification-information management section 202 gives the management IDs to respective pages of the electronic document contained in the print information. At this time, the identification-information management section 202 registers the given management IDs, the electronic document name, the page numbers, the paper size of each page, and the image orientation in the identification information DB 203 in association with each other. Further, when position shift information is input, the identification-information management section 202 references the management ID contained in the position shift information and registers the position shift amount in the identification information DB 203. Therefore, in the exemplary embodiment, the identification information DB 203 functions as a storage section. Further, when the writing information is input, the identification-information management section 202 references the management ID contained in the writing information and reads out the corresponding position shift amount from the identification information DB 203. The identification-information management section 202 creates the writing correction information, which associates the position shift amount with the writing information.

The transmitting section 204 transmits the writing correction information created in the identification-information management section 202.

Figure 2B:
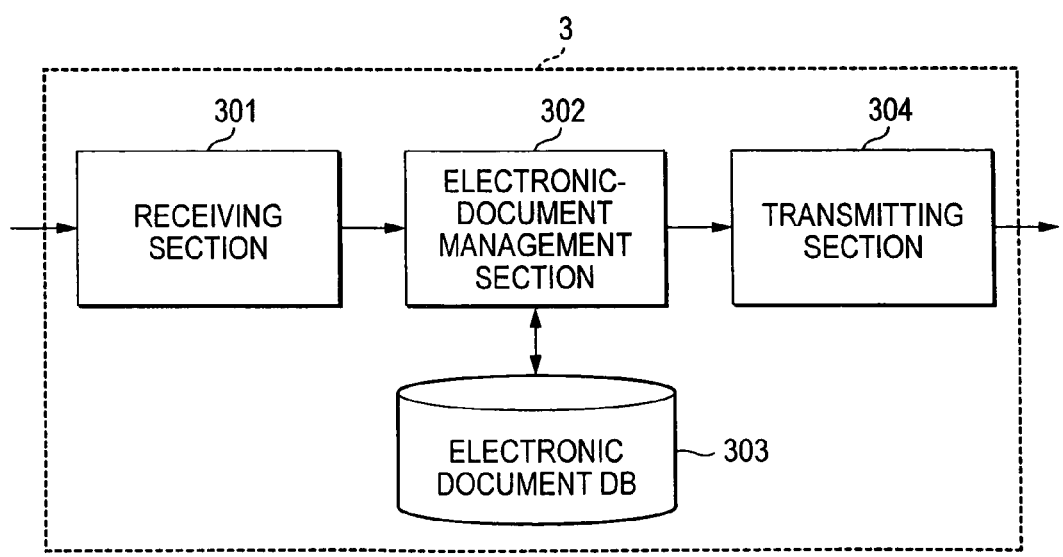

FIG. 2B is a functional block diagram to show a configuration example of the document management server 3. The document management server 3 includes a receiving section 301, an electronic-document management section 302, an electronic document DB 303 and a transmitting section 304.

The receiving section 301 receives the print management information and the writing correction information from the ID management server 2.

The electronic-document management section 302 registers various pieces of data in the electronic document DB 303 and makes an inquiry. Specifically, when the print management information is input, the electronic-document management section 302 registers the management IDs and contents of the respective pages of the electronic document in the electronic document DB 303 in association with each other. Therefore, in the exemplary embodiment, the electronic document DB 303 functions as a storage section. When the writing correction information is input, the electronic-document management section 302 references the management ID contained in the writing correction information and reads out the corresponding electronic document from the electronic document DB 303. In this case, the electronic-document management section 302 creates postscribed information, which associates the management ID and the read electronic document with each other.

The transmitting section 304 transmits the postscribed information created in the electronic-document management section 302.

Figure 3:
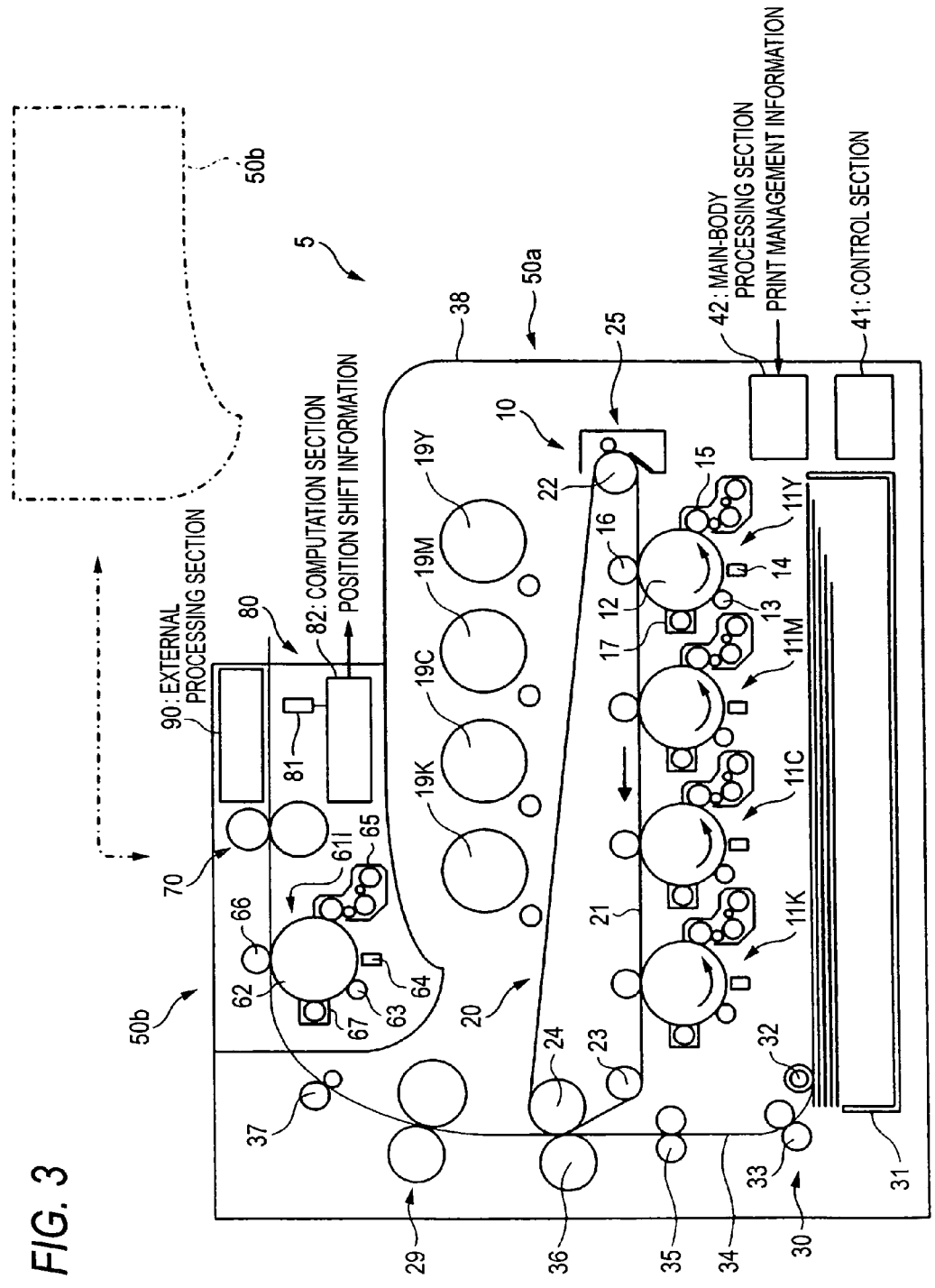
FIG. 3 is a drawing to show a configuration example of a printer including a main body unit and an external unit.

FIG. 3 is a drawing to show a configuration example of the printer 5 as an image forming apparatus. The printer 5 includes a main body unit 50a and an external unit 50b externally connected to the main body unit 50a. The main body unit 50a functioning as a first unit, and the external unit 50b functioning as a second unit. Each of the main body 50a and the external unit 50b is configured so as to function alone as a printer. The main body unit 50a is a full-color printer for forming an image using four color toners of yellow, magenta, cyan, and black. On the other hand, the external unit 50b is a monochrome printer for forming an image using a single color (in the exemplary embodiment, invisible) toner. In the example, the external unit 50b is detachable from the main body unit 50a, and the printer 5 functions as a four-color or five-color printer in accordance with a user's request.

First, the main body unit 50a will be described. The main body unit 50a includes an image formation process system 10, a paper transport system 30, a control section 41, and a main-body processing section 42. The image formation process system 10 forms an image based on image data of each color generated in the main-body processing section 42. The paper transport system 30 transports paper in response to the operation of the image formation process system 10. The control section 41 controls the operation of the main body unit 50a and the external unit 50b. The main-body processing section 42 is connected to the network N (see FIG. 1) and performs processing for the received print command and data of electronic document, etc.

The image formation process system 10 includes four image formation units, namely, a yellow image formation unit (Y unit) 11Y, a magenta image formation unit (M unit) 11M, a cyan image formation unit (C unit) 11C, and a black image formation unit (K unit) 11K, and a transfer unit 20. The Y unit 11Y, the M unit 11M, the C unit 11C, and the K unit 11K functioning as a document-image forming section are placed in parallel with a given spacing from each other in the horizontal direction.

Each of the image formation units 11 (11Y, 11M, 11C, 11K) includes a photoconductor drum 12 disposed rotatably. The photoconductor drum 12 is surrounded by a charger 13, an exposure device 14, a developing device 15, a primary transfer roll 16, a drum cleaner 17, etc., in order. The charger 13 charges the photoconductor drum 12 at a predetermined potential. The exposure device 14 selectively applies a light beam to the photoconductor drum 12 charged at the predetermined potential by the charger 13 to form an electrostatic latent image. The developing device 15 stores the corresponding color component toner (for example, in the Y unit Y11, yellow toner) and develops the electrostatic latent image on the photoconductor drum 12 in the toner. The primary transfer roll 16 primarily transfers the toner image formed on the photoconductor drum 12 to an intermediate transfer belt 21 according to an applied primary transfer bias. The drum cleaner 17 removes residues (toner, etc.,) on the photoconductor drum 12 after the primary transfer.

In the exemplary embodiment, the exposure device 14 is implemented as an LPH (LED Print Head) having a large number of LEDs (Light Emitting Diodes) arranged in a main scanning direction, for example. An ROS (Raster Output Scanner) using an LD (Laser Diode) can also be used, for example, as the exposure device 14.

Toner cartridges 19Y, 19M, 19C, and 19K for supplying corresponding color toners to the developing devices 15 of the image formation units 11 are provided above the image formation units 11 (11Y, 11M, 11C, and 11K) with the intermediate transfer belt 21 between.

The transfer unit 20 includes the intermediate transfer belt 21, a drive roll 22, a tension roll 23, a backup roll 24, and a belt cleaner 25. The intermediate transfer belt 21 is placed and supported on the drive roll 22, the tension roll 23, and the backup roll 24 and turns in the arrow direction. The drive roll 22 stretches the intermediate transfer belt 21 and drives and turns the intermediate transfer belt 21. The tension roll 23 stretches the intermediate transfer belt 21 for giving a predetermined tension to the intermediate transfer belt 21 and rotates as driven by the intermediate transfer belt 21 driven by the drive roll 22. The backup roll 24 stretches the intermediate transfer belt 21 and functions as a component of a secondary transfer unit. The belt cleaner 25 is attached to a part opposed to the drive roll 22 with the intermediate transfer belt 21 between and removes residues (toner, etc.,) on the intermediate transfer belt 21 after secondary transfer.

The paper transport system 30 includes a paper feed tray 31, a najor roll 32, a feed roll 33, a transport passage 34, a registration roll 35, a secondary transfer roll 36, an ejection roll 37, and an ejection tray 38. A fuser 29 for heating, pressurizing, and fixing the image secondarily transferred onto paper is provided between the secondary transfer roll 36 and the ejection roll 37. Paper on which an image is formed is stacked in the paper feed tray 31. The najor roll 32 takes out and supplies paper stacked in the paper feed tray 31. The feed roll 33 separates paper taken out by the najor roll 32 one sheet at a time and transports paper to the transport passage 34. The registration roll 35 once stops paper transported on the transport passage 34 and transports the paper at a proper timing to a secondary transfer position. The secondary transfer roll 36 and the backup roll 24 make up the secondary transfer unit and the secondary transfer roll 36 secondarily transfers the image on the intermediate transfer belt 21 onto the transported paper. The ejection roll 37 ejects the paper on which the image is fixed by the fuser 29 to the outside of the printer. The ejection tray 38 is provided on the top of printer section 1 and the already recorded paper ejected by the ejection roll 37 is stacked in the ejection tray 38. In the printer 5, however, the external unit 50b is placed on the top of the ejection tray 38 and thus the paper ejected by the ejection roll 37 is delivered into the external unit 50b.

Next, the external unit 50b will be described. The external unit 50b includes an invisible-image forming unit (I unit) 61I, a fixing device 70, a position-shift-amount measuring section 80, and an external processing section 90. The I unit 61I functioning as a code-image forming section forms a toner image based on invisible image data generated in the external processing section 90. The fixing device 70 heats, pressurizes, and fixes the invisible toner image formed on paper in the I unit 61I. The operation of the external unit 50b is controlled by the control section 41 provided in the main body unit 50a.

The I unit 61I includes a photoconductor drum 62 disposed rotatably. The photoconductor drum 62 is surrounded by a charger 63, an exposure device 64, a developing device 65, a transfer roll 66, a drum cleaner 67, etc., in order. The charger 63 charges the photoconductor drum 62 at a predetermined potential. The exposure device 64 selectively applies a light beam to the photoconductor drum 62 charged at the predetermined potential by the charger 63 to form an electrostatic latent image. The developing device 65 stores invisible toner and develops the electrostatic latent image on the photoconductor drum 62 in the invisible toner. The transfer roll 66 transfers the toner image formed on the photoconductor drum 62 to intermediate transfer belt paper according to an applied primary transfer bias. The drum cleaner 67 removes residues (toner, etc.,) on the photoconductor drum 62 after the transfer.

The fixing device 70 fixes the invisible toner image formed on paper in the I unit 61I.

The position-shift-amount measuring section 80 measures the position shift amount between (i) the image (visible image) formed on the paper by the main body unit 50a and (i) the image (invisible image) formed on the same paper by the external unit 50b. The position-shift-amount measuring section 80 includes an image detection sensor 81 for detecting the images on the paper (visible image and invisible image) and a computation section 82 for executing predetermined computation processing based on the image detection result of the image detection sensor 81.

The external processing section 90 performs processing on data such as the print command and the identification information, which are received through the main-body processing section 42.

The toner used in the printer 5 will be described.

The following toners are used in the main body unit 50a: Yellow toner (Y toner) used in the Y unit 11Y, magenta toner (M toner) used in the M unit 11M, cyan toner (C toner) used in the C unit 11C, and black toner (K toner) used in the K unit 11K are toners used conventionally, namely, toners containing a visible light absorption material for absorbing the corresponding wavelength range light in a binding resin. Accordingly, a yellow, magenta, cyan, or black visible image can be formed in the Y unit 11Y, the M unit 11M, the C unit 11C, and the K unit 11K.

In the external unit 50b, for example, material described in JP-A-2003-186238 can be used as I toner used in the I unit 61I. That is, toner containing a far-red light absorption material made up of inorganic material particles in a binding resin is used. Accordingly, an invisible image can be formed using such toner in the I unit 61I.

However, the terms "visible" and "invisible" are not used to mean recognizable or unrecognizable to human's eyes. That is, the terms "visible" and "invisible" are distinguished from each other depending on whether or not an image printed (formed) on a medium (paper) can be recognized depending on the presence or absence of color development caused by absorption of a specific wavelength in a visible light region.

Figure 4:
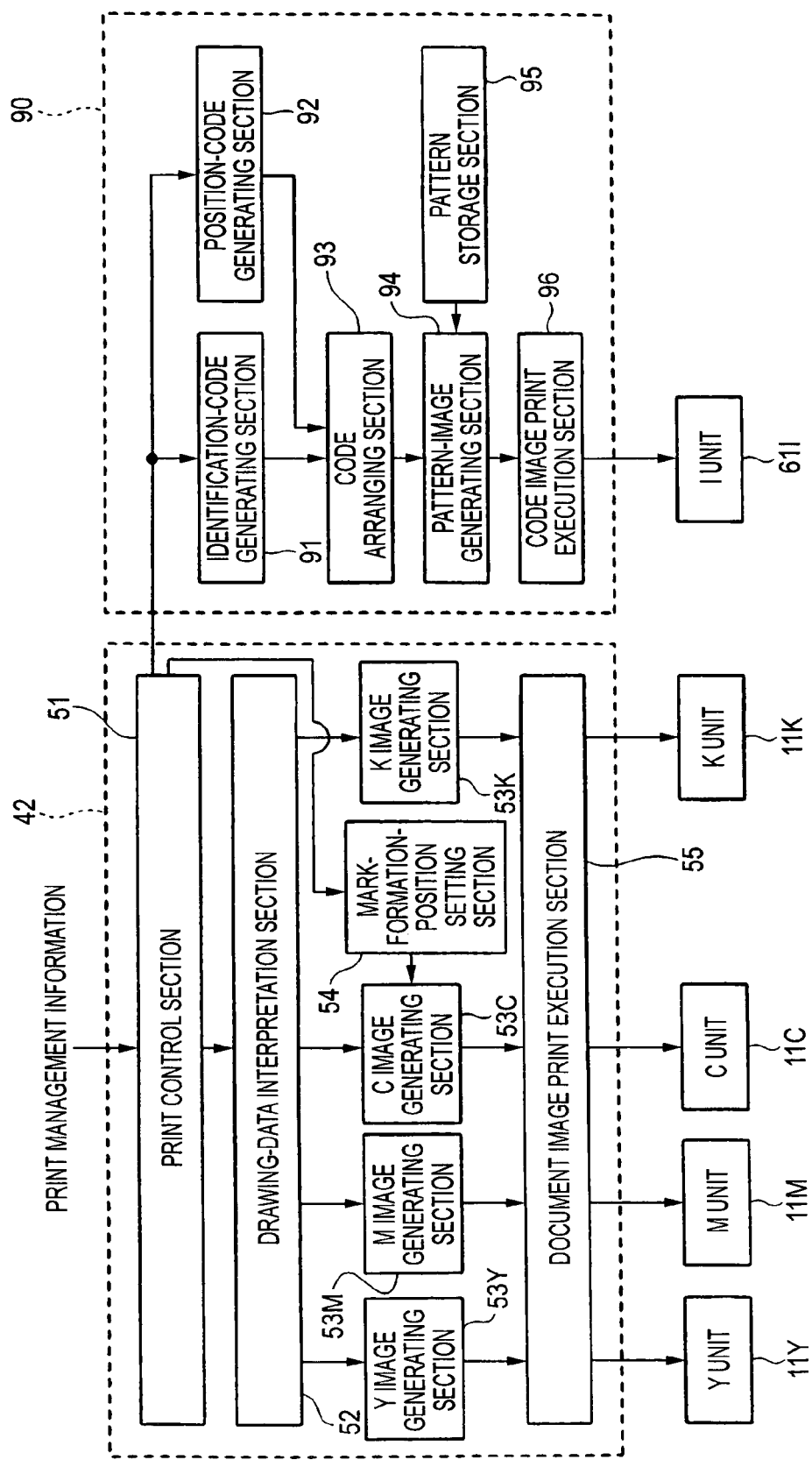
FIG. 4 is a functional block diagram of a main-body processing section and an external processing section in the printer.

FIG. 4 is a functional block diagram to show an example of the configurations of the main-body processing section 42 and the external processing section 90 in the printer 5.

First, the main-body processing section 42 will be described. The main-body processing section 42 includes a print control section 51, a drawing-data interpretation section 52, image generating sections 53 (a Y image generating section 53Y, an M image generating section 53M, a C image generating section 53C, and a K image generating section 53K), a mark-formation-position setting section 54, and a document image print execution section 55.

The print control section 51 receives the print management information sent from the ID management server 2 (see FIG. 1). The print control section 51 passes the print information contained in the received print management information, that is, the electronic document and the print attributes to the drawing-data interpretation section 52, and passes the print attributes and management ID, which are contained in the print information, to the external processing section 90. The print control section 51 passes the print attributes contained in the received print management information to the mark-formation-position setting section 54. The print control section 51 controls operations of the drawing-data interpretation section 52, the image generating sections 53, the mark-formation-position setting section 54 and the document image print execution section 55. Also, the print control section 51 controls operation of components of the external processing section 90.

The drawing-data interpretation section 52 interprets the print information (print data) input from the print control section 51, converts the print information into a drawing command, which makes up a part of the print data, and issues the command.

The image generating sections 53 (the Y image generating section 53Y, the M image generating section 53M, the C image generating section 53C, and the K image generating section 53K) execute the drawing command input from the drawing-data interpretation section 52 and generate yellow image data, magenta image data, cyan image data and black image data (document image data) for each page.

The mark-formation-position setting section 54 sets a position on each page where a mark is formed as well as the contents of the electronic document, based on the input print attributes. The set mark-formation-position data is output to the C image generating section 53C. Thus, the C image generating section 53C generates cyan image data (document image data) for each page, using (i) the drawing command input from the drawing-data interpretation section 52 and (ii) the mark-formation-position data set by the mark-formation-position setting section 54.

The document image print execution section 55 outputs page image data of the respective colors, which are generated by the Y image generating section 53Y, the M image generating section 53M, the C image generating section 53C and the K image generating section 53K, in synchronization with each other to the Y unit 11Y, the M unit 11M, the C unit 11C, and the K unit 11K. Specifically, the document image print execution section 55 outputs yellow page image data generated by the Y image generating section 53Y to the Y unit 11Y, magenta page image data generated by the M image generating section 53M to the M unit 11M, cyan page image data generated by the C image generating section 53C to the C unit 11C, and black page image data generated by the K image generating section 53K to the K unit 11K.

Next, the external processing section 90 will be described. The external processing section 90 includes an identification-code generating section 91, a position-code generating section 92, a code arranging section 93, a pattern-image generating section 94, a pattern storage section 95 and a code image print execution section 96.

The identification-code generating section 91 generates identification code based on the management ID of the electronic document input from the print control section 51.

The position-code generating section 92 generates a position code corresponding to the paper, on which the electronic document, that is, document image is to be printed, based on the print attributes of the electronic document input from the print control section 51. The position code is used to obtain coordinates on the paper, which is a print target. The position code is set appropriately in accordance with the print attributes of the paper size, orientation, scale up/scale down, N-up, etc.

The code arranging section 93 combines the identification code generated by the identification-code generating section 91 and the position code generated by the position-code generating section 92 to generate a two-dimensional code array corresponding to the output image size. At this time, the identification codes are identical to each other irrespective of the arrangement positions of the respective identification codes. Also, the position codes vary depending on those arrangement positions.

The pattern-image generating section 94 takes out a bit pattern image corresponding to the two-dimensional code array from the pattern storage section 95, and outputs the bit pattern image as a code image of the two-dimensional code array.

The code image print execution section 96 outputs a code image data generated by the pattern-image generating section 94 to the C unit 11C.

Figure 5B:
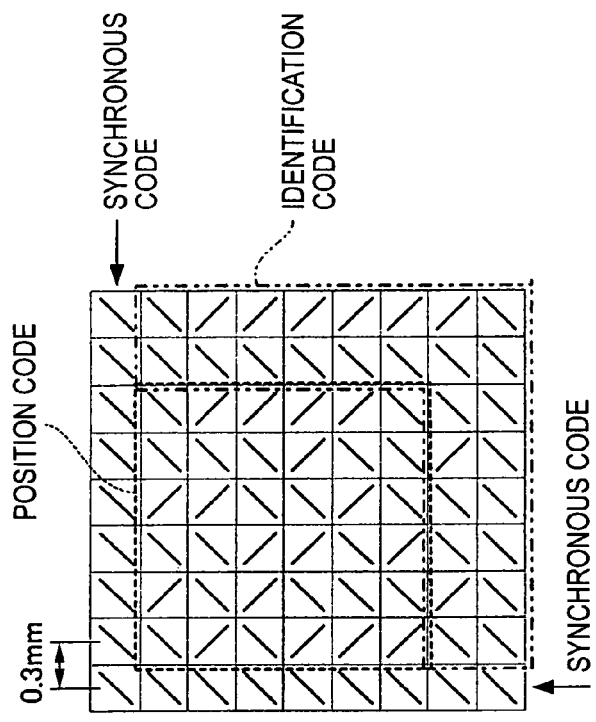
FIG. 5A to 5C are drawings to describe a two-dimensional code image.
Figure 5A:
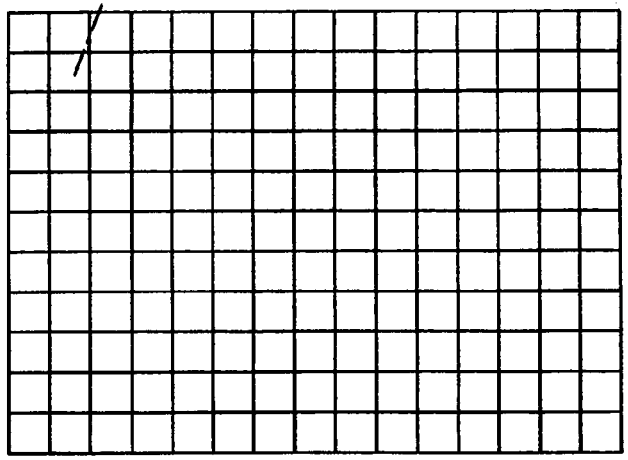
Figure 5C:
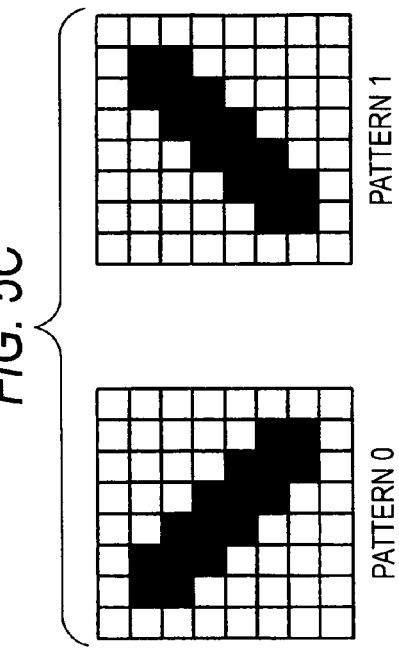

FIGS. 5A to 5C are drawings to describe the two-dimensional code image generated by the pattern-image generating section 94. FIG. 5A is a schematic view showing units of the two-dimensional code image formed of an invisible image wherein the units are represented like lattices. FIG. 5B is a drawing to show one unit of the two-dimensional code image. Further, FIG. 5C is a drawing to describe slanting line patterns of a backslash "\" and a slash "/."

The two-dimensional code image shown in FIGS. 5A to 5C is formed as an invisible image on which mechanical read by infrared application and decoding processing can be performed stably over a long term. Also the invisible image can recode information at a high density. The two-dimensional code image may be an invisible image that can be provided in any desired region independently of a region, where a visible image is formed, on the surface of the paper on which an image is output. Particularly, in the exemplary embodiment, the invisible image is formed on a full face of paper (paper face) in accordance with the size of a used medium. Furthermore, an invisible image may be recognized based on a gloss difference when viewed by human's eyes.

The two-dimensional code pattern shown in FIG. 5B contains a region to store the position code indicating the coordinate position on the paper and a region to store the identification code for uniquely identifying the electronic document or paper. The two-dimensional code pattern also contains a region to store a synchronous code. As shown in FIG. 5A, the plural two-dimensional code patterns are arranged. The two-dimensional codes including different position information are arranged in a lattice shape on the full face of the paper (paper face) in accordance with the size of the printed paper. That is, the plural two-dimensional code patterns as shown in FIG. 5B are arranged on one surface of the paper, each of the two-dimensional code patterns including a position code, an identification code and a synchronous code. Different pieces of position information are arranged in the respective regions of the position codes depending on the position where the position code is arranged. On the other hand, the same identification information is arranged in the identification-code regions independently of the position where the identification code is arranged.

In FIG. 5B, the position code is arranged in a 6-bit×6-bit rectangular region. The bit values are formed of minute line bit maps, which are different in rotation angle. Slanting line patterns (patterns 0 and 1) shown in FIG. 5C represent bit values 0 and 1. More specifically, bits 0 and 1 are represented using a backslash "\" and a slash "/," which are different in inclination. Each slanting line pattern has a size of 8 pixels×8 pixels in 600 dpi (dots per inch). The slanting line pattern lowering to the right (pattern 0) represents the bit value 0, and the slanting line pattern rising to the right (pattern 1) represents the bit value 1. Therefore, one slanting line pattern can represent 1-bit information (0 or 1). Using such minute line bit maps involving two types of inclinations, it becomes possible to provide two-dimensional code patterns with extremely small noise given to a visible image, the two-dimensional code patterns in which a large amount of information can be digitized and embedded at a high density.

That is, 36-bit position information is stored in the position-code region shown in FIG. 5B. Of the 36 bits, 18 bits may be used as code X coordinates and the other 18 bits may be used as code Y coordinates. If the 18 bits for the X coordinates and those for the Y coordinates are all used for coding positions, $2^{18}$ (about 260,000) positions can be coded. When each slanting line pattern is formed to have 8 pixels×8 pixels (600 dpi) as shown in FIG. 5C, the size of the two-dimensional code (containing the synchronous code) in FIG. 5B becomes about 3 mm in length and about 3 mm in width (8 pixels×9 bits×0.0423 mm) because one dot of 600 dpi is 0.0423 mm. To code 260,000 positions with 3-mm spacing, a length of about 786 m can be coded. All 18 bits may be thus used to code positions or if a detection error of a slanting line pattern occurs, a redundancy bit for error detection and error correction may be contained.

The identification code is arranged in a 2-bit×8-bit rectangular region and a 6-bit×2-bit rectangular region, and 28-bit identification information can be stored. To use all 28 bits as the identification information, $2^{28}$ (about 270,000,000) pieces of identification information can be represented. A redundancy bit for error detection and error correction can be contained in the 28 bits of the identification code like the position code.

In the example shown in FIG. 5C, the two slanting line patterns differ in angle 90 degrees, but if the angle difference is set to 45 degrees, for example, four types of slanting line patterns can be formed. In so doing, one slanting line pattern can represent 2-bit information (any of 0 to 3). That is, as the number of angle types of slanting line patterns is increased, the number of bits that can be represented can be increased.

In the example shown in FIG. 5C, coding of the bit values is described using the slanting line patterns, but the patterns that can be selected are not limited to the slanting line patterns. For example, a coding method of dot ON/OFF or a coding method depending on a direction in which the dot position is shifted from the reference position can also be adopted.

Figure 6:
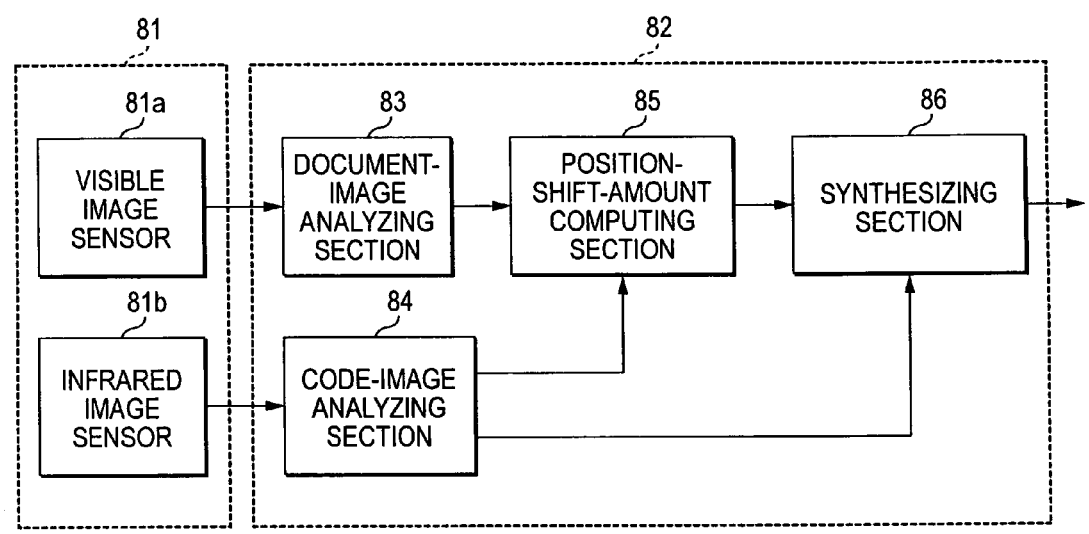
FIG. 6 is a block diagram to show a configuration example of a position-shift-amount measuring section.

FIG. 6 is a block diagram to show a configuration example of the position-shift-amount measuring section 80 shown in FIG. 3. The position-shift-amount measuring section 80 includes the image detection sensor 81 and the computation section 82 as described above.

The image detection sensor 81 has a visible image sensor 81a and an infrared image sensor 81b. The visible image sensor 81a detects a visible image on the code paper 8 ejected from the fixing device 70, that is, the document image formed by the main body unit 50a. On the other hand, the infrared image sensor 81b detects an infrared image on the same code paper 8, that is, the code image formed by the external unit 50b.

The computation section 82 includes a document-image analyzing section 83, a code-image analyzing section 84, a position-shift-amount computing section 85 and a synthesizing section 86.

The document-image analyzing section 83 analyzes read data of the visible image (document image), which is read by the visible image sensor 81a, and acquires a position where the mark is formed in cyan.

The code-image analyzing section 84 analyzes the position code based on read data of the infrared image (code image), which is read by the infrared image sensor 81b, and acquires a position where the identification code corresponding to the position where the mark is formed. The code-image analyzing section 84 analyzes the identification code based on the read data of the infrared image and acquires the management ID of the code paper 8 from the identification code.

The position-shift-amount computing section 85 finds a position shift amount between the document image and the code image, based on the position where the mark is formed, which is obtained by the document-image analyzing section 83, and the analysis result of the position code provided by the code-image analyzing section 84.

The synthesizing section 86 creates position the shift information, which associates the position shift amount found by the position-shift-amount computing section 85 and the management ID obtained by the code-image analyzing section 84 with each other, and transmits the position shift information.

Figure 7:
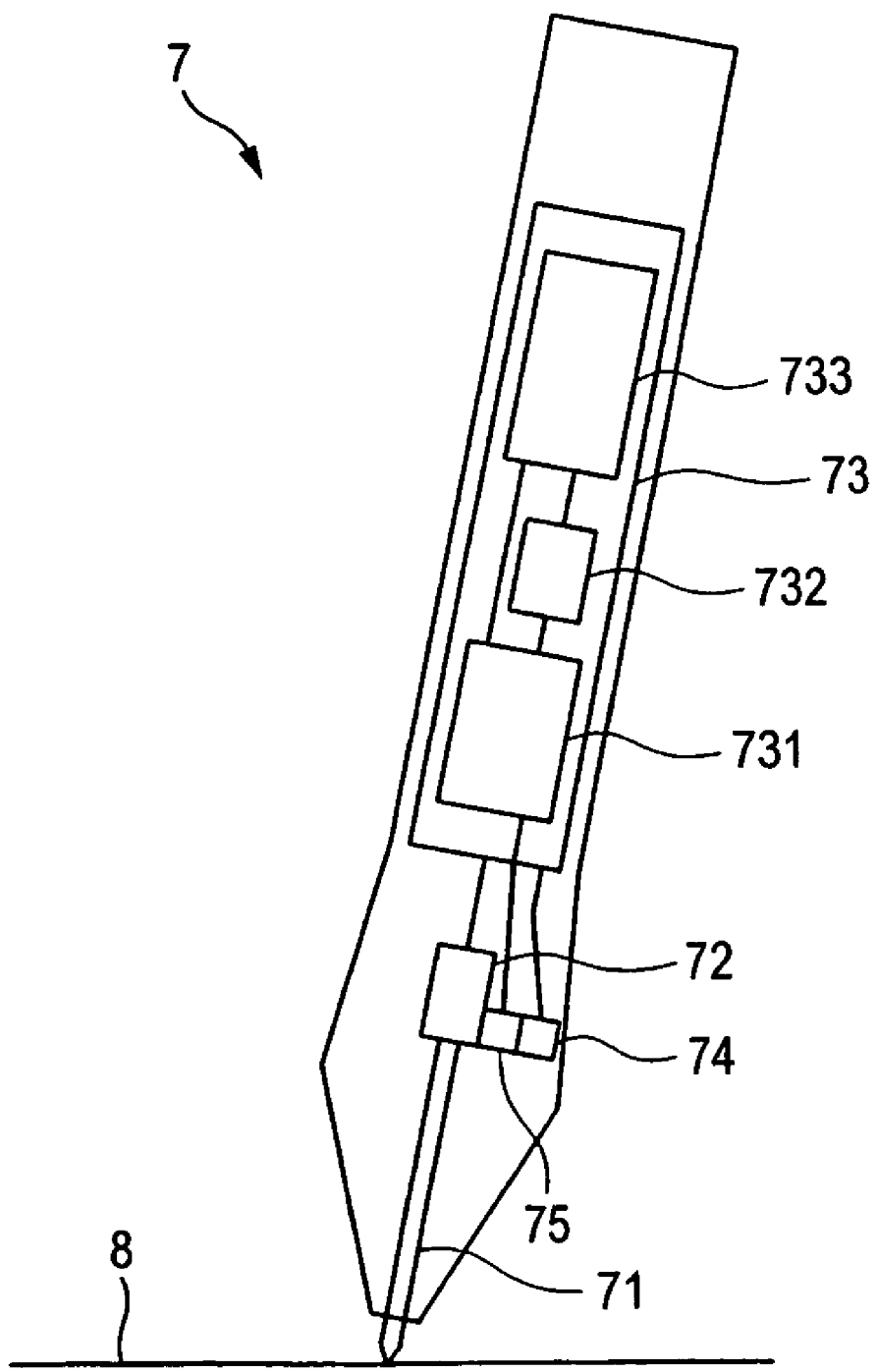
FIG. 7 is a drawing to show a configuration example of an electronic pen.

FIG. 7 is a drawing to show a configuration example of the electronic pen 7. The electronic pen 7 includes a writing section 71, a writing-pressure detecting section 72, a control section 73, an infrared application section 74 and an image input section 75. The writing section 71 records text and a pattern in a similar manner to that of a usual pen, on the code paper 8 on which a document image and a code image are synthesized and are printed. The writing-pressure detecting section 72 monitors motion of the writing section 71 and detects that the electronic pen 7 is pressed against the code paper 8. The control section 73 controls the electronic operation of the whole electronic pen 7. The infrared application section 74 applies infrared light for reading the code image on the code paper 8. The image input section 75 captures and inputs the code image formed on the code paper 8 to which the infrared light is applied.

The control section 73 will be described in more detail. The control section 73 includes a code acquiring section 731, a trace calculating section 732, and an information storage section 733. The code acquiring section 731 analyzes the image input from the image input section 75 and acquires code (position information, identification information). The trace calculating section 732 corrects the shift between the coordinates of the pen point of the writing section 71 and the coordinates of the image captured by the image input section 75 with respect to the code (position information) acquired by the code acquiring section 731 and calculates the trace of the pen point. The information storage section 733 stores the code acquired by the code acquiring section 731 and the trace information calculated by the trace calculating section 732.

The handwritten-information acquiring terminal 6 has a function of outputting writing information received from the electronic pen 7 to the network N and can be implemented as a PC, for example, like the client terminal 1. Wireless communications between the handwritten-information acquiring terminal 6 and the electronic pen 7 can use various systems of a wireless LAN, Bluetooth, etc., for example. The communications therebetween are not limited to the wireless communications. For example, a wired system may be used or a cradle for the electronic pen 7 and the handwritten-information acquiring terminal 6 may be connected and when the electronic pen 7 is attached to the cradle, communications may be conducted.

Figure 8:
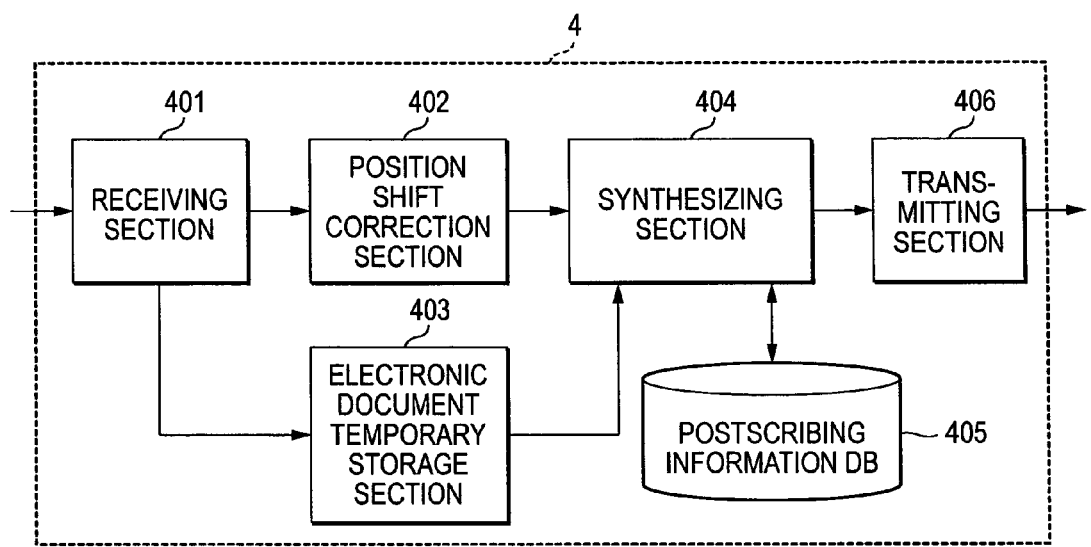
FIG. 8 is a functional block diagram of a service server.
Figure 9:
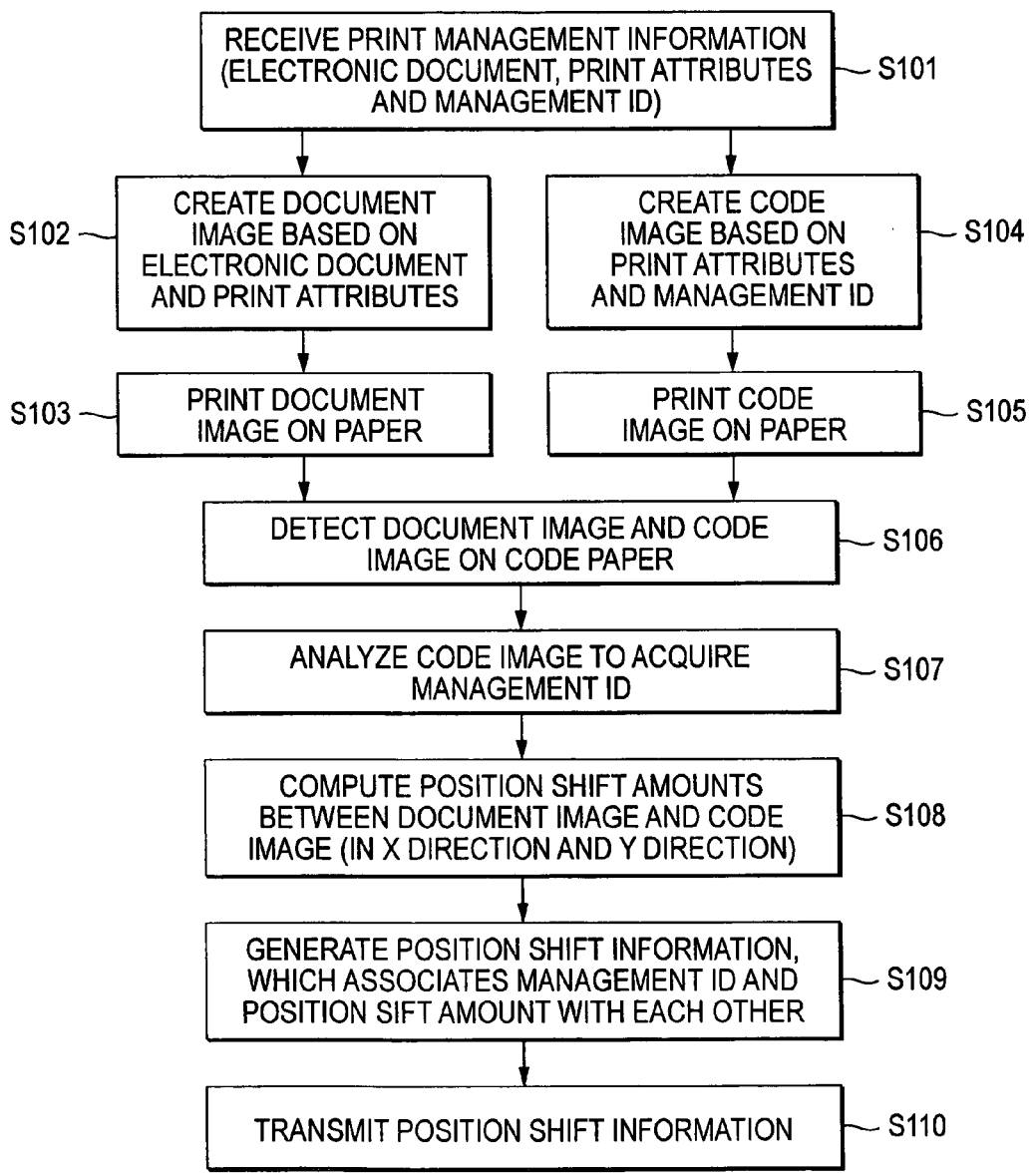
FIG. 9 is a flowchart to describe the print process of code paper on the printer.

FIG. 8 is a functional block diagram to show a configuration example of the service server 4. The service server 4 includes a receiving section 401, a position shift correction section 402, an electronic document temporary storage section 403, a synthesizing section 404, an postscribing information DB 405, and a transmitting section 406.

The receiving section 401 receives writing correction information from the ID management server 2 and postscribed information from the document management server 3, and the like.

The position shift correction section 402 performs a position shift correction on the trace information contained in the writing correction information using the position shift amount contained in the same writing correction information to provide corrected trace information.

The electronic document temporary storage section 403 temporarily retains the postscribed information, namely, the management ID and electronic document.

The synthesizing section 404 combines the electronic document and the corrected trace information through the mediation of the identification code to create postscribing information. The synthesizing section 404 registers the created postscribing information in the postscribing information DB 405.

The transmitting section 406 transmits the postscribing information to the client terminal 1 and the handwritten-information acquiring terminal 6, for example.

The print process of the code paper 8 using the printer 5 will be described in detail with reference to a flowchart of FIG. 9 and FIGS. 3 to 6.

First, the print control section 51 receives the print management information transmitted from the ID management server 2 (step 101). The print management information is created based on the print command from the client terminal 1 as described above. The print management information contains an electronic document, the print attributes of the electronic document and the management ID.

Next, the drawing-data interpretation section 52, the image generating sections 53 (53Y, 53M, 53C, and 53K), the mark-formation-position setting section 54 and the document image print execution section 55, which form the main-body processing section 42, create a document image based on the electronic document and the print attributes thereof, which are contained in the print management information (step 102). The document image is printed on paper using the Y unit 11Y, the M unit 11M, the C unit 11C, and the K unit 11K (step 103). Therefore, the document image is formed of a visible image. In the printed document image, the mark whose formation position is set by the mark-formation-position setting section 54 is also printed as well as the electronic document.

On the other hand, the identification-code generating section 91, the position-code generating section 92, the code arranging section 93, the pattern-image generating section 94, the pattern storage section 95 and the code image print execution section 96, which form the external processing section 90, generate a code image based on the print attributes and the management ID, which are contained in the print management information (step 104). The code image is printed on the paper using the I unit 61I (step 105). The code image is printed on the paper on which the document image has already been printed at step 103. That is, the document image and the code image, which are based on the electronic document given the same management ID, are printed on the same paper. Then, the code paper 8 is output.

Next, when the code paper 8 on which the document image and the code image are thus printed is transported to the exit of the external unit 50b, the position-shift-amount measuring section 80 detects the document image and the code image on the code paper 8 (step 106). Specifically, the visible image sensor 81a detects the document image on the code paper 8 as visible image data, and the infrared image sensor 81b detects the code image on the code paper 8 as infrared image data. The computation section 82 analyzes the document image from the visible image data and analyzes the code image from the infrared image data. Consequently, the code-image analyzing section 84 acquires the management ID of the code paper 8 from the infrared image data (step 107). The position-shift-amount computing section 85 computes the position shift amounts between the document image and the code image (X-direction shift amount (second position shift amount) and Y-direction shift amount (first position shift amount)) from the visible image data and the infrared image data (step 108). Then, the synthesizing section 86 generates position shift information, which associates the obtained management ID and the obtained position shift amounts with each other (step 109). The synthesizing section 86 transmits the generated position shift information (step 110).

Figure 10C:
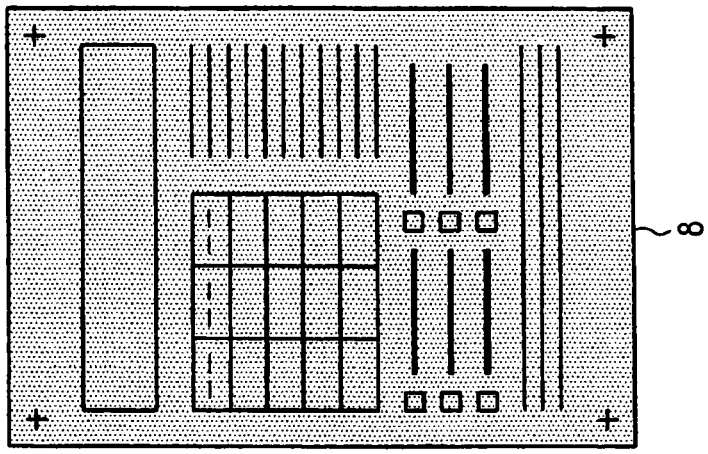
FIGS. 10A to 10C are drawings to show an outline of the code paper.
Figure 10B:
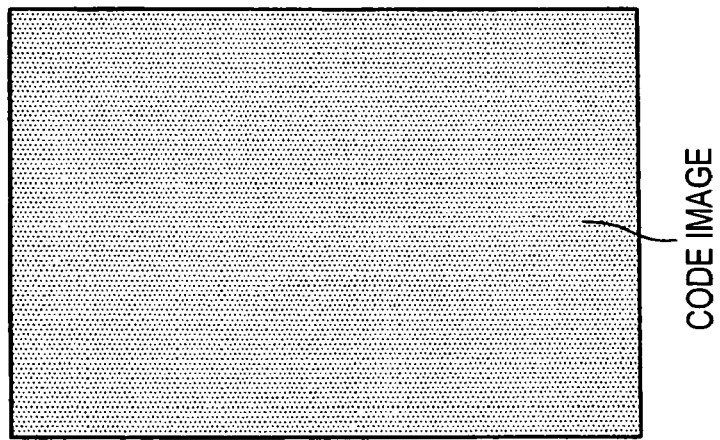
Figure 10A:
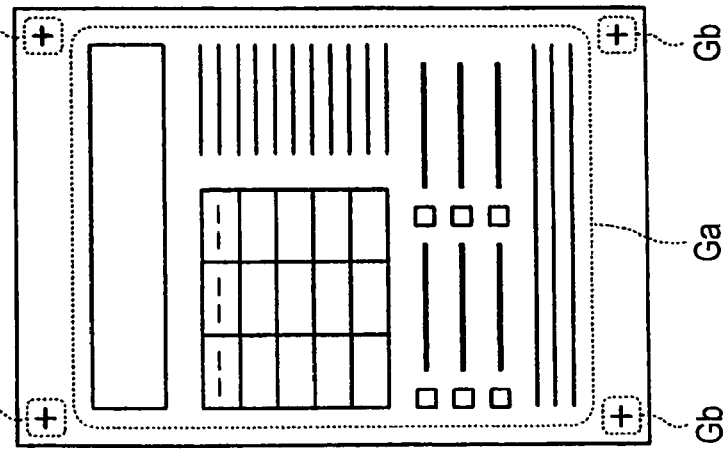

FIG. 10 is a drawing to show an outline of the code paper 8 printed on the printer 5. FIG. 10A shows a document image printed on paper by the main body unit 50a. FIG. 10B shows a code image printed on paper by the external unit 50b. FIG. 10C shows code paper 8 provided by printing the document image and the code image on paper.

The document image shown in FIG. 10A is a visible image and has a document image part Ga, which is generated based on the electronic document, and mark image parts Gb, which is generated based on the print attributes (particularly, the paper size and the image orientation). The mark image parts Gb are set by the mark-formation-position setting section 54 as described above. Therefore, the mark image parts Gb are formed in cyan. In the example, the mark image parts Gb are formed in four corners of the paper, and the formation positions of the mark image parts Gb vary depending on the paper size and the image orientation. In the exemplary embodiment, cross images called as register marks are formed as the marks.

The code image shown in FIG. 10B is an invisible image and basically is formed on the full face of paper. However, the code image may not be formed at an end of paper because of the limitation of the printer 5 (specifically, the external unit 50b) as described above. The code image contains the position codes and the identification code as shown in FIG. 5.

The document image and the code image are printed on the same paper. Thereby, the print document, that is, the code paper 8 shown in FIG. 10C is output.

Figure 11B:
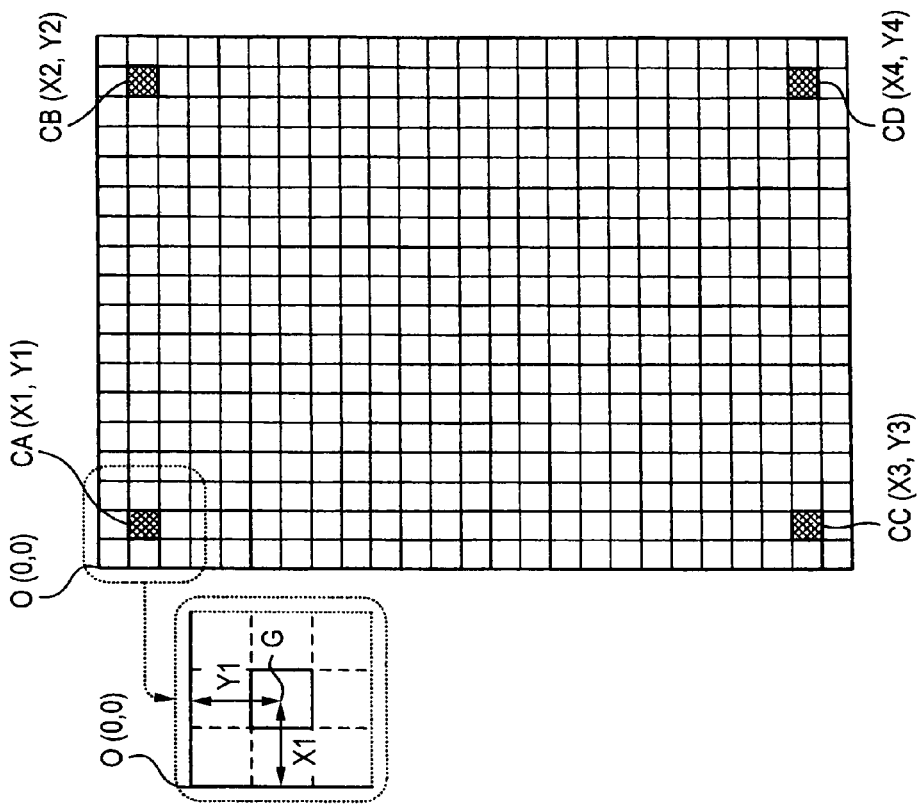
FIGS. 11A and 11B are drawings to describe the principle of acquiring a position shift amount between a document image and a code image.
Figure 11A:
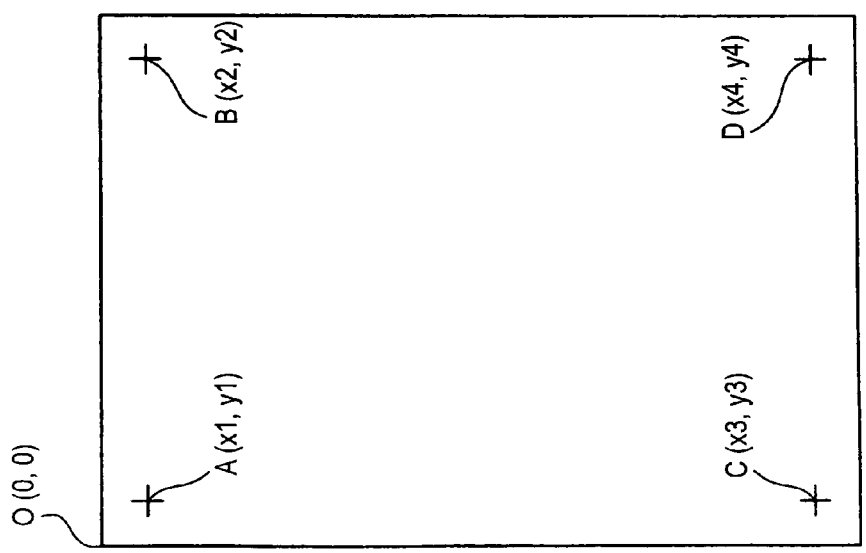

Next, acquisition of the position shift amounts at step 108 will be described in more detail. FIG. 11 is a drawing to describe the principle of acquisition of the position shift amounts between the document image and the code image, which is executed by the computation section 82. FIG. 11A shows the positions where the marks are formed (positions where certain images are formed), the marks which are contained in the document image. FIG. 11B shows the positions where code images including certain position of the code image are formed (positions where certain position information is formed). The "certain code images" refer to those, which are arranged in an ideal state at the positions on which the mark formation positions are superposed.

The document-image analyzing section 83 of the computation section 82 detects the position of each mark image part Gb (specifically, the position of the intersection point of each cross) in the document image with one corner of the paper, which forms the code paper 8 (in the figure, the upper left end), regarded as the origin. The code-image analyzing section 84 of the computation section 82 detects the center of gravity G of a predetermined position code in the code image (the position code of the code image essentially formed at the position corresponding to the position where the mark image is formed) with the one corner of the paper (the upper left end) regarded as the origin. The position-shift-amount computing section 85 computes the relative shift amounts between the position in question of the document image and the position in question of the code image.

Here, it is assumed that the intersection point formation positions (coordinates) of the respective marks in the document image are A (x1, y1), B (x2, y2), C (x3, y3), and D (x4, y4). It is also assumed that the center-of-gravity positions of the predetermined position codes in the code image are CA (X1,Y1), CB (X2,Y2), CC (X3,Y3), and CD (X4,Y4). At this time, the position shift amount X (position shift amount in the X direction) and the position shift amount Y (position shift amount in the Y direction) between the document image and the code image can be represented by the following expressions:

$$\text{Position Shift Amount } X = \frac{(X1 - x1) + (X2 - x2) + (X3 - x3) + (X4 - x4)}{4}$$

$$\text{Position Shift Amount } Y = \frac{(Y1 - y1) + (Y2 - y2) + (Y3 - y3) + (Y4 - y4)}{4}$$

Thus, the position shift amounts between the document image and the code image on the same code paper 8, that is, the relative positional relationship between the document image and the code image can be obtained.

FIG. 12 is a drawing to show a structure example of a database registered in the identification information DB 203 of the ID management server 2 shown in FIG. 2A. In the data structure shown in FIG. 12, items of management ID, electronic document name, page information, paper size, image orientation, X-direction shift amount, and Y-direction shift amount are included and their correspondence is managed. In the example shown in FIG. 12, identification IDs 1 to 6 indicate the case where a six-page electronic document of A4 portrait size is printed. The printed pages are managed individually according to the different management IDs (1 to 6) and the electronic document name is the same URL, but the page information differs like 1 to 6. Likewise, identification IDs 7 and 8 indicate the case where a two-page electronic document of A4 landscape size is printed, and identification IDs 9 and 10 indicate the case where a two-page electronic document of A3 landscape size is printed.

The management ID, the electronic document name, the page information, the paper size, and the image orientation are registered when the ID management server 2 receives print information as a print command is given from the client terminal 1. When the position shift information of the code paper 8 printed on the printer 5 is received, the X-direction shift amount and the Y-direction shift amount are registered in association with the management ID contained in the position shift information.

Figure 13:
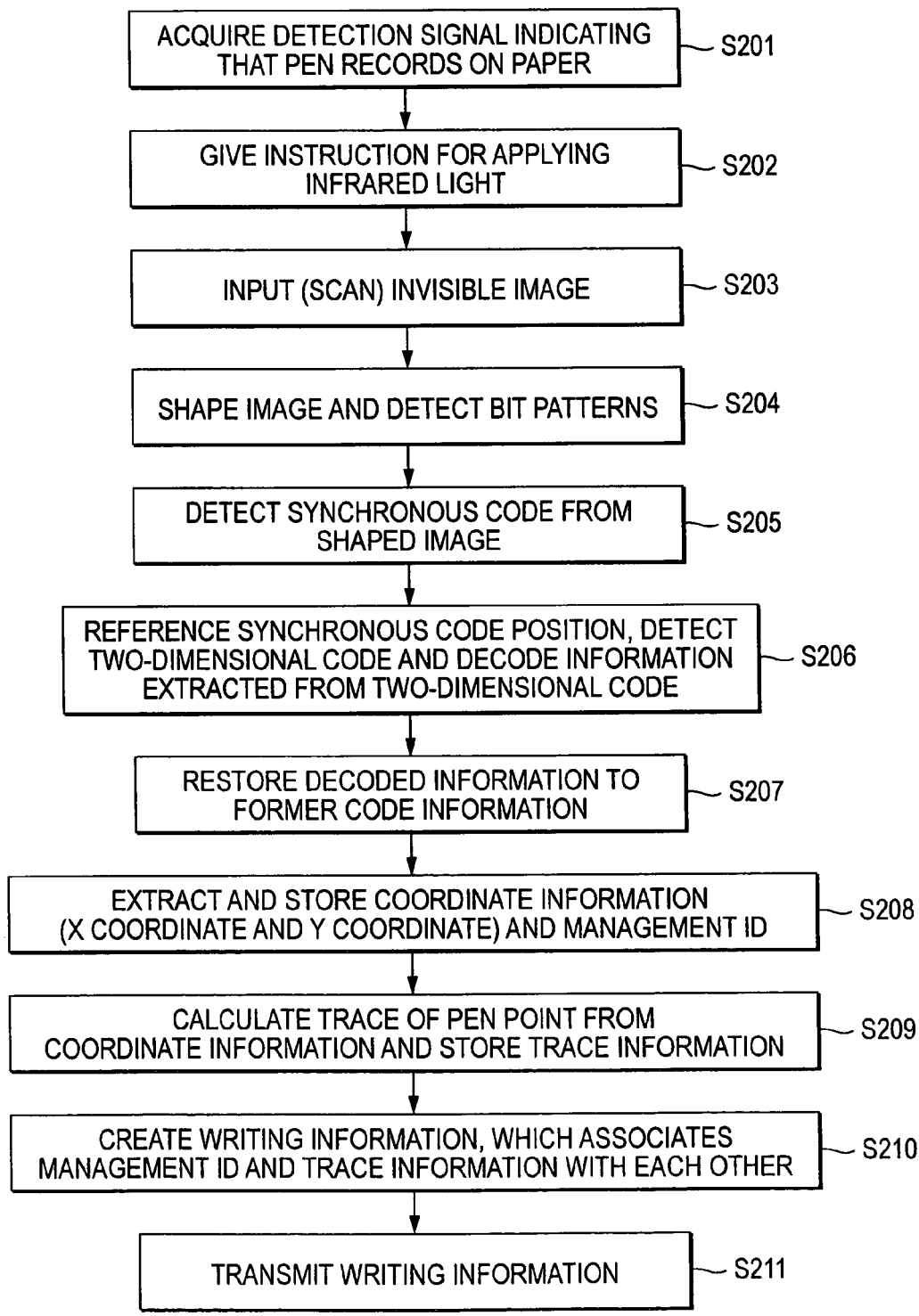
FIG. 13 is a flowchart to describe postscribing to a code paper with the electronic pen and generating writing information.

Next, additional write to the code paper 8 with the electronic pen 7 and generation of writing information will be described in detail with reference to a flowchart of FIG. 13. FIG. 13 shows processing executed by the control section 73 provided in the electronic pen 7.

When the user records (writes) text or a pattern on the code paper 8, for example, with the electronic pen 7, the control section 73 acquires a detection signal of recording on the code paper 8 by the writing section 71 from the writing-pressure detecting section 72 (step 201). Upon detection of the detection signal, the control section 73 instructs the infrared application section 74 to apply infrared light to the code paper 8 (step 202). The infrared light applied to the code paper 8 by the infrared application section 74 is absorbed by the code image (invisible image). The image input section 75 captures the code image to which the infrared light is applied. The control section 73 inputs (scans) the invisible image through the image input section 75 (step 203).

Then, the code acquiring section 731 of the control section 73 executes code image detection processing indicated at steps 204 to 210. First, the input scan image is shaped. Shaping the scan image is inclination correction, noise removal, etc., for example. Bit patterns of a slash "/," a backslash "," etc., (slanting line patterns) are detected from the shaped scan image (step 204). On the other hand, a synchronous code of a two-dimensional code positioning code is detected from the shaped scan image (step 205). The code acquiring section 731 references the synchronous code position, detects a two-dimensional code, and takes out and decodes information of ECC (Error Correction Code), etc., from the two-dimensional code (step 206), and restores the decoded information to former code information (step 207).

The code acquiring section 731 of the control section 73 takes out the X and Y coordinates and the management ID from the code information thus provided and stores the taken-out position coordinates and management ID in the information storage section 733 (step 208). On the other hand, the trace calculating section 732 calculates the trace of the pen point from the coordinate information stored in the information storage section 733 and stores the calculated trace information in the information storage section 733 (step 209). The code acquiring section 731 creates writing information associating the management ID and the trace information stored in the information storage section 733 with each other (step 210) and transmits the writing information to the handwritten-information acquiring terminal 6 (step 211).

Then, the writing information is transmitted through the network N to the ID management server 2. The ID management server 2 reads the X direction position shift amount and the Y direction position shift amount corresponding to the management ID contained in the received writing information and transmits writing correction information associating each position shift amount with the writing information.

Figure 14:
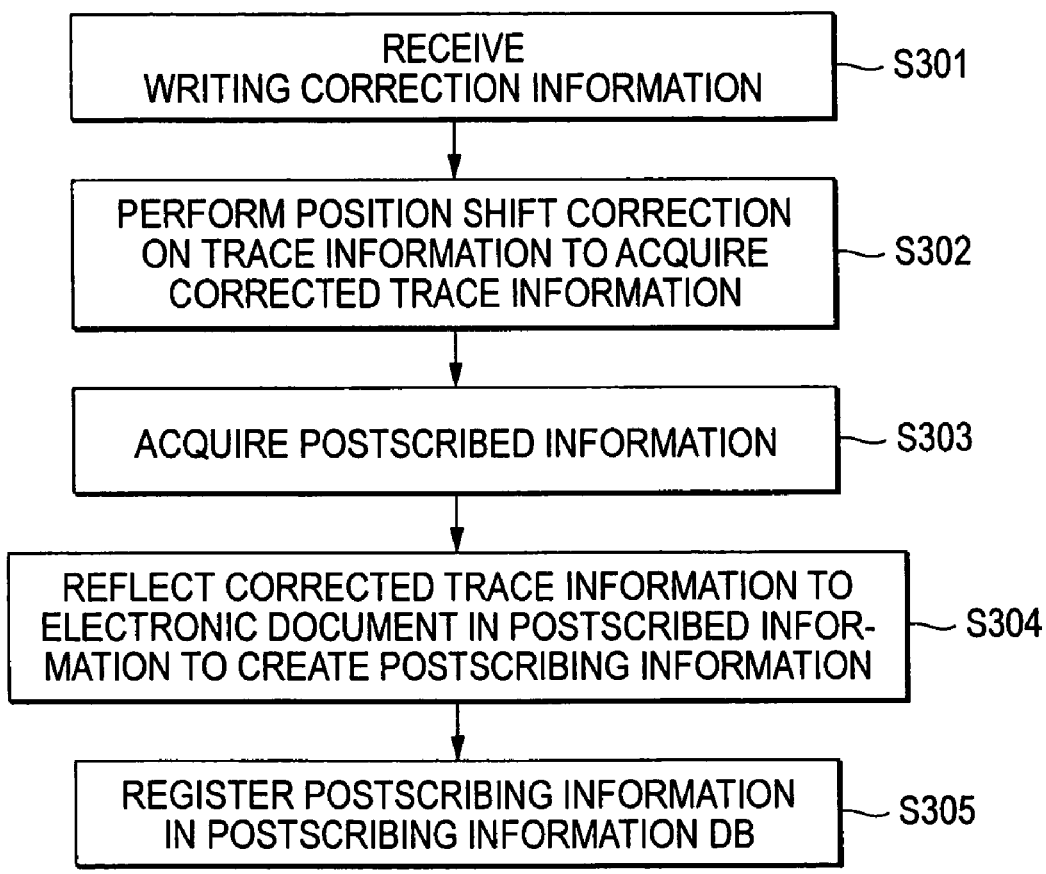
FIG. 14 is a flowchart to describe a processing flow of position shift correction executed by a service server.

Then, the service server 4 shown in FIG. 8 executes processing of position shift correction, etc., in accordance with a flowchart of FIG. 14.

First, the receiving section 401 of the service server 4 receives the writing correction information sent from the ID management server 2 (step 301). Next, the position shift correction section 402 executes position shift correction to the trace information using the trace information and the X direction and Y direction position shift amounts contained in the writing correction information and acquires corrected trace information (step 302). The service server 4 uses the transmitting section 406 to inquire of the document management server 3 about information of the electronic document corresponding to the management ID contained in the writing correction information, namely, postscribed information. Consequently, the receiving section 401 acquires the postscribed information from the document management server 3 (step 303). The acquired postscribed information is temporarily stored in the electronic document temporary storage section 403.

The synthesizing section 404 reflects the corrected trace information obtained in the position shift correction section 402 on the electronic document contained in the postscribed information read from the electronic document temporary storage section 403 to create postscribing information (step 304). Then, the synthesizing section 404 stores the created postscribing information in the postscribing information DB 405 (step 305).

For example, if an output request of postscribing information is received from the handwritten-information acquiring terminal 6 or the client terminal 1, the synthesizing section 404 reads the postscribing information corresponding to the management ID contained in the request from the postscribing information DB 405 and outputs the postscribing information through the transmitting section 406.

As described above, in the exemplary embodiment, when the code paper 8 is created on the printer 5, the position shift amounts between the document image and the code image printed on paper are measured. Print management information associating the obtained position shift amounts and the management ID provided by analyzing the read code image with each other is generated and is output.

In the exemplary embodiment, an electronic document, the print attributes of the electronic document, and the position shift amounts are registered in the database in association with the management ID and when additional write is executed onto the code paper 8 with the electronic pen 7, the writing information with the electronic pen (trace information) is corrected using the position shift amounts.

Accordingly, the position shift between the document image and the code image can be corrected and write with the electronic pen 7 can be reflected on the original electronic document more precisely. Consequently, in the exemplary embodiment, when the code paper 8 is printed, the need for enhancing the registration accuracy between the document image and the code image is eliminated and the apparatus configuration of the printer 5 can be simplified.

Particularly, in the exemplary embodiment, the document image is printed in the main body unit 50*a* and the code image is printed in the external unit 50*b* externally connected to the main body unit 50*a* and thus it is difficult to align the document image and the code image. The technique described in the exemplary embodiment is extremely useful for the case where a plurality of units (printers) are combined to form the printer 5.

In the exemplary embodiment, the management ID given to each paper is used to associate the information pieces with each other. Thus, when position shift information is registered or the writing information is corrected, associating erroneous information pieces with each other is eliminated and precise correction can be made.

Further, in the exemplary embodiment, to acquire the position shift amounts between a document image and a code image, when the document image is printed, predetermined marks are formed in addition to the contents of the electronic document. Using the position codes contained in the code image, from the positional relationship between the mark and its corresponding position code, the shift amounts therebetween are measured. Accordingly, the position shift amounts between the document image and the code image can be measured more easily.

In the exemplary embodiment, a document image and a code image are consecutively printed on paper using the printer 5 to provide code paper 8, but the invention is not limited to the mode. For example, the following mode is also possible: only a code image is previously printed on paper, the paper with the code image printed thereon is set in the paper feed tray 31 of the main body unit 50*a*, for example, and a document image is printed on the paper to provide code paper 8. In this case, the external unit 50*b* becomes unnecessary. In this case, the position-shift-amount measuring section 80 may be provided in the paper ejection section of the main body unit 50*a* for measuring the position shift amounts between the document image and the code image on the provided code paper 8.

In the exemplary embodiment, marks are formed in the four corners of paper, thereby obtaining the X-direction shift amount and the Y-direction shift amount, but the invention is not limited to the mode. For example, a mark may be formed at one point of paper for obtaining the position shift amounts.

What is claimed is:

1. An electronic document management method comprising:
   detecting a relative positional relationship between (i) a code image containing position information, which is used to specify a position on a surface of a medium and is printed on the medium, and (ii) a document image formed on the medium based on an electronic document;

storing the detected relative positional relationship in a storage section;

accepting writing correction information including trace information indicating trace of a writing device on a surface of the medium on which the document image and the code image are formed; and correcting the trace information using the relative positional relationship read from the storage section.

2. The method according to claim 1, wherein:

the code image further contains identification information, which is used to identify the medium, the detecting further detects the identification information, the storing step stores information of the relative positional relationship in the storage section in association with the identification information, the accepting further accepts the identification information, and the correcting comprises reading the relative positional relationship associated with the identification information from the storage section and correcting the trace information.

3. The method according to claim 2, further comprising:

storing the electronic document and the identification information in the storage section in association with each other, wherein:

the correcting comprises:

reading the electronic document associated with the identification information from the storage section;

correcting the trace information using the relative positional relationship read from the storage section; and associating the corrected trace information with the electronic document.

* * * * *